(12) United States Patent
Hartmann

(10) Patent No.: US 7,246,594 B2
(45) Date of Patent: Jul. 24, 2007

(54) METHOD FOR OPERATING AN INTERNAL COMBUSTION ENGINE HAVING A PLURALITY OF CYLINDER BANKS

(75) Inventor: Dirk Hartmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 11/165,784

(22) Filed: Jun. 23, 2005

(65) Prior Publication Data

US 2006/0005811 A1 Jan. 12, 2006

(30) Foreign Application Priority Data

Jul. 8, 2004 (DE) ............... 10 2004 033 231

(51) Int. Cl.
 *F02D 45/00* (2006.01)
(52) U.S. Cl. ................................. 123/198 F
(58) Field of Classification Search ............ 123/198 F, 123/198 DB, 198 DC
 See application file for complete search history.

(56) References Cited

U.S. PATENT DOCUMENTS 4,550,704 A * 11/1985 Barho et al. ................. 123/481
5,099,816 A * 3/1992 Ohga et al. ................. 123/481
5,481,461 A * 1/1996 Miyamoto et al. ............ 701/99
5,562,086 A * 10/1996 Asada et al. ............ 123/568.21
6,499,449 B2 * 12/2002 Michelini et al. ......... 123/90.15
6,546,910 B2 * 4/2003 Tanaka et al. .............. 123/348

* cited by examiner

*Primary Examiner*—Stephen K. Cronin
*Assistant Examiner*—Jason Benton
(74) *Attorney, Agent, or Firm*—Kenyon & Kenyon LLP

(57) ABSTRACT

A method for operating an internal combustion engine having a plurality of cylinder banks provides a cylinder cut-off using at least a reduced ignition angle retardation shift. In this context, at least one first cylinder bank is configured such that it is at least partially able to be cut off. Immediately before a cut off or immediately after a reactivation of at least one cylinder of the at least one first cylinder bank, a first output variable is set for the at least one first cylinder bank and a second output variable is set for at least one second cylinder bank. The first output variable and the second output variable are set differently from each other in such a way that an average of the first and second output variables is equivalent to a predetermined output variable of the internal combustion engine.

14 Claims, 4 Drawing Sheets

METHOD FOR OPERATING AN INTERNAL COMBUSTION ENGINE HAVING A PLURALITY OF CYLINDER BANKS

FIELD OF THE INVENTION

The present invention relates to a method for operating an internal combustion engine having a plurality of cylinder banks.

BACKGROUND INFORMATION

It is known in the art that an internal combustion engine having a plurality of cylinder banks may be operated such that at least one first cylinder bank is at least partially able to be cut off.

In conventional methods for cylinder cut-off, the charge for the cylinders not to be cut off is already built up immediately before the cut-off of the cylinders to be cut off in a so-called transitional phase, that is, while the cylinder cut-off is still inactive. Thereby, the resulting torque that is output by the internal combustion engine would increase. However, in order to keep this torque constant, the angle of ignition is pulled to retardation or the fuel supply is partially blanked out. When the charge of the cylinders that are not to be cut off has reached the required setpoint value, the cylinder cut-off is activated and the ignition angle is pulled to advance again, to the optimal earlier value, or the partial blanking out of the fuel supply for the cylinders not to be cut off is revoked. In this way, the missing contribution to torque by the cut-off cylinders may be compensated for.

What is problematic with this approach is that, in the transitional phase immediately before the cut-off of the cylinders to be cut off, by pulling the ignition angle to retardation, an increase in fuel consumption and an increase in exhaust gas temperatures are caused. In this context, because of the increased exhaust gas temperatures, damage may result to a catalytic converter that is situated in an exhaust branch of the internal combustion engine.

SUMMARY OF THE INVENTION

In the method according to the present invention for operating an internal combustion engine having a plurality of cylinder banks, immediately before a cut-off or immediately after a reactivation of at least one cylinder of the at least one first cylinder bank, for the at least one first cylinder bank a first output variable is set, and for at least a second cylinder bank a second output variable is set, the first output variable and the second output variable being set differently from each other in such a way that, on average, they correspond to a predetermined output variable of the internal combustion engine. In this way, in the transitional phase immediately before the cut-off or immediately after the reactivation of the at least one cylinder of the at least one first cylinder bank, the second output variable of the at least one second cylinder bank may be increased, for example, by increasing the charge of the cylinder of the at least one second cylinder bank, without having to compensate for this increase of the second output variable by pulling the ignition angle to a retardation state. The compensation of the increased second output variable may rather be made by reducing the first output variable of the at least one first cylinder bank. In this context, the first output variable may come about, for instance, by reducing the charge of the cylinder of the at least one first cylinder bank. According to the present invention, because of the asymmetrical setting of the first output variable and the second output variable, increased fuel consumption and increased exhaust gas temperatures may be substantially minimized in the transitional phase immediately before the cut-off or immediately after the reactivation of the at least one cylinder of the at least one first cylinder bank, and thereby damage to a catalytic converter in the exhaust branch of the internal combustion engine may be reduced.

It is advantageous if the air supply to the at least one first cylinder bank is influenced by at least one first actuator and/or the air supply to the at least one second cylinder bank is influenced by at least one second actuator. In this way, by the different setting of the two actuators, one may simply implement, while avoiding timing retardation, the asymmetry of the first output variable and the second output variable simply with the aid of different charges for the cylinders of the at least one first cylinder bank and the at least one second cylinder bank.

It is also advantageous if the at least one cylinder of the at least one first cylinder bank is cut off only when a second predetermined value of the second output variable has been reached, because of the influencing of the air supply using the at least one second actuator. In this manner, it is ensured that the cylinder cut-off takes place only when the contribution of the second output variable is sufficiently large to completely realize the predetermined output variable of the internal combustion engine after the cut-off of the at least one cylinder of the at least one first cylinder bank. Consequently, the cylinder cut-off may be performed without a change in the output variable of the internal combustion engine, and thus in an unnoticed manner. In particular, this avoids a sudden change in the output variable of the internal combustion engine during the cylinder cut-off. This is an advantage especially if the internal combustion engine is driving a vehicle. In this case, the cylinder cut-off may take place unnoticed by the driver, and thereby especially comfortably.

Furthermore, it is advantageous if, in addition, the second output variable is set by the influence of an ignition angle, e.g., by a timing retardation of the ignition angle. In this way, the timing retardation of the ignition angle may be used for corrections in the second output variable. This is an advantage especially if the increase in the second output variable is not able to be completely compensated for, for instance, because of the combustion limit of the cylinders of the at least one first cylinder bank, by reducing the first output variable in the transitional phase immediately before a cut-off or immediately after a reactivation of the at least one cylinder of the at least one first cylinder bank. In this case, it may be ensured by the influencing of the ignition angle that the predetermined output variable of the internal combustion engine is held constant even in the transitional phase immediately before the cut-off or immediately after the reactivation of the at least one cylinder of the at least one first cylinder bank, so that this remains unnoticed by the driver of a vehicle powered by the internal combustion engine.

In order to limit the undesired influence of an ignition angle, e.g., one pulled to retard, especially the undesired influence on the fuel consumption and on the exhaust gas temperatures, it may be provided that the influencing of the ignition angle upon cut-off of the at least one cylinder of the at least one first cylinder bank is revoked, or that the influencing of the ignition angle is introduced only upon reactivation of the at least one cylinder of the at least one first cylinder bank.

For the purpose of keeping to the combustion limit of the at least one first cylinder bank, it may be advantageous to limit the first output variable downwards in absolute amount to a predetermined threshold value. Consequently, it is ensured that the at least one first cylinder bank has no engine misfirings during the transitional phase immediately before a cut-off or immediately after a reactivation of the at least one cylinder of the at least one first cylinder bank, which would lead to an uncomfortable sudden change in the output variable of the internal combustion engine.

This may be avoided if the predetermined threshold value is selected as a function of a combustion limit of the at least one first cylinder bank.

In order to avoid additional undesired ignition angle interventions, it is advantageous if a change in the first output variable is limited, immediately before the cut-off or immediately after the reactivation of the at least one cylinder of the at least one first cylinder bank, in absolute amount by a change in the second output variable.

Because of this measure, it is additionally ensured that the predetermined output variable of the internal combustion engine is maintained without the second output variable having to be corrected to the first output variable, for instance, by an ignition angle intervention, as far as this is possible at all in the first place.

An additional advantage comes about if a third output variable is predetermined for the at least one second cylinder bank, and it is selected in such a way that the predetermined output variable of the internal combustion engine comes about after the cut-off or before the reactivation of the at least one cylinder of the at least one first cylinder bank. In this way it is ensured that the predetermined output variable of the internal combustion engine is able to be realized after the cut-off or before the reactivation of the at least one cylinder of the at least one first cylinder bank, simply with the aid of the at least one second cylinder bank.

In this context, it is advantageous if the third output variable is realized, after the cut-off or before the reactivation of the at least one cylinder of the at least one first cylinder bank, only by the influencing of the air supply using the second actuator. In this manner, an ignition angle intervention and thereby an undesirably high fuel consumption and undesirably high exhaust gas temperatures are avoided.

Furthermore, it is advantageous if the first output variable is set by the influence of the air supply, using the at least one first actuator, in such a way that an increase in the second output variable is compensated for with respect to the predetermined output variable of the internal combustion engine. In this way, one may compensate for an increase in the second output variable, for the purpose of maintaining the predetermined output variable of the internal combustion engine, in a simple manner and without an ignition angle intervention, and only by influencing the air supply using the at least one first actuator immediately before the cut-off or immediately after the reactivation of the at least one cylinder of the at least one first cylinder bank.

The asymmetrical setting of the first output variable and the second output variable, immediately before the cut-off or immediately after the reactivation of the at least one cylinder of the at least one first cylinder bank, may be realized in a simple manner and without an ignition angle intervention, by setting the first actuator and the second actuator appropriately, asymmetrically for taking up different positions from each other.

DETAILED DESCRIPTION

Figure 1:
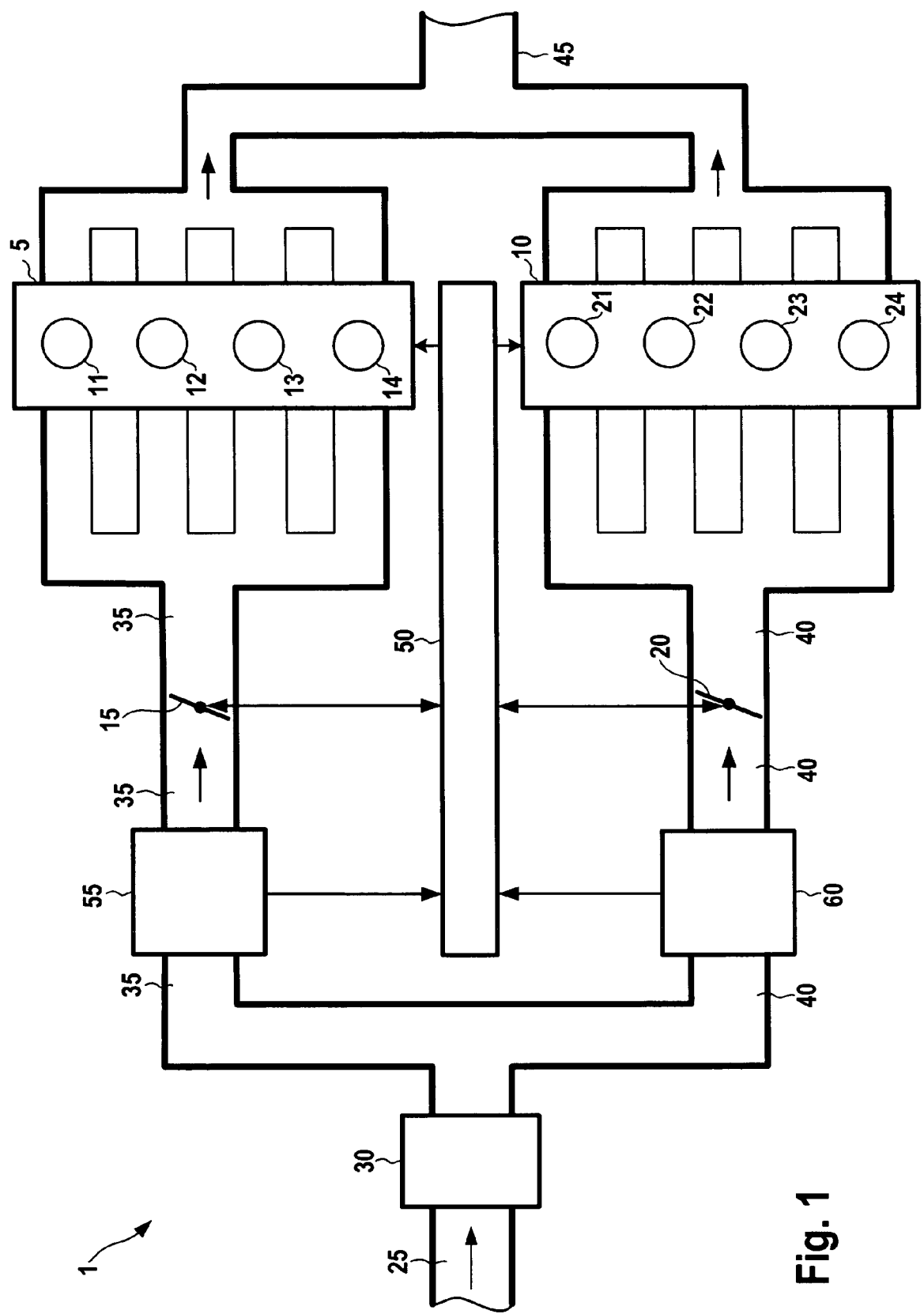
FIG. 1 shows a schematic illustration of an internal combustion engine having two cylinder banks.

In FIG. 1, reference numeral 1 designates an internal combustion engine that powers a vehicle, for example. Internal combustion engine 1 may be developed, for example, as an Otto engine or a Diesel engine. In the following, it is assumed by way of example that internal combustion engine 1 takes the form of an Otto engine. According to FIG. 1, internal combustion engine 1 includes two cylinder banks 5, 10. In this context, each of the two cylinder banks 5, 10 includes four cylinders, in the example shown in FIG. 1. Thus, in first cylinder bank 5 are situated a first cylinder 11, a second cylinder 12, a third cylinder 13 and a fourth cylinder 14. In a second cylinder bank 10 are situated a fifth cylinder 21, a sixth cylinder 22, a seventh cylinder 23 and an eighth cylinder 24. The cylinders of the two cylinder banks 5, 10 are supplied with fresh air via a common air supply line 25. The flow direction of the fresh air is indicated by arrows in FIG. 1. In common air supply line 25 there is situated an air filter 30, which keeps away dust contained in the supplied air from cylinder banks 5, 10, and thereby prevents engine wear. Downstream from air filter 30, common air supply line 25 divides into a first air channel 35 and a second air channel 40. In this context, in first air channel 35 there is situated a first air mass flow meter 55, for instance, in the form of a hot film air mass flow meter, which measures the air mass flow in first air channel 35 and passes on the measuring result to an engine control unit 50. Downstream from first air mass flow meter 55, in first air channel 35, there is a first actuator 15, whose position is set by engine control unit 50, for instance, as a function of a driver's command that is to be implemented. In the following, it is to be assumed by way of example that first actuator 15 is a first throttle valve. Downstream from first throttle valve 15, first air channel 35 branches into four air lines which conduct the fresh air to the four cylinders 11, 12, 13, 14 of first cylinder bank 5. In addition, the setting of first throttle valve 15 is recorded by a measuring device (not shown in greater detail in FIG. 1), for instance, in the form of a potentiometer, and is reported back to engine control unit 50. As indicated in FIG. 1 by an arrow to first cylinder bank 5, engine control unit 50 controls the ignition points and the fuel supply of the four cylinders 11, 12, 13, 14 of first cylinder bank 5. In this context, the fuel may be added directly into individual cylinders 11, 12, 13, 14 of first cylinder bank 5, or may be admixed to the supplied air upstream of, or downstream from first throttle valve 15.

Second air channel 40 is constructed in a corresponding way, and it includes a second air mass flow sensor (meter) 60, for instance, also in the form of a hot film air mass sensor, which, in turn, measures the air mass flow in second air channel 40, and passes the measuring result along to engine control unit 50. Downstream from second air mass flow sensor 60, a second actuator 20 is situated in second air channel 40, for instance, also in the form of a throttle valve, whose setting is made by engine control unit 50, for instance, also dependent on the driver's command, and whose position is reported back, by a measuring device not shown in FIG. 1, for example, in the form of a potentiometer, to engine control unit 50. Downstream from second throttle valve 20, second air channel 40 branches into four air lines to the four cylinders 21, 22, 23, 24 of second cylinder bank 10. The ignition firing points and the fuel quantity supplied to cylinders 21, 22, 23, 24 of second cylinder bank 10 are also predetermined by engine control unit 50, in this context, as is shown by the second arrow to second cylinder bank 10. In this context, the fuel supply to cylinders 21, 22, 23, 24 of second cylinder bank 10 may also be admixed to the supplied air directly or upstream of or downstream from throttle valve 20. In this context, the fuel quantity supplied to cylinders 11, 12, 13, 14, 21, 22, 23, 24 of the two cylinder banks 5, 10, may be, for example, predetermined by engine control unit 50 for maintaining a predefined air/fuel mixture ratio. The ignition firing points of cylinders 11, 12, 13, 14, 21, 22, 23, 24 of the two cylinder banks 5, 10 may be suitably predetermined by engine control unit 50, for example, for setting a desired reserve for an output variable of internal combustion engine 1, for instance, for a torque reserve that is to be set, or with regard to heating up a catalytic converter situated in a common exhaust branch 45. The exhaust gas formed during the combustion of the air/fuel mixture in the cylinders of the two cylinder banks 5, 10 is then first carried off via individual exhaust gas lines of the individual cylinders and then via the common exhaust branch 45, with a catalytic converter that may be optionally situated in common exhaust branch 45 not being shown in FIG. 1 for reasons of clarity. The flow direction of the exhaust gas is also indicated by arrows in FIG. 1. Intake and outlet valves of the individual cylinders are also not shown in FIG. 1, also for reasons of clarity.

Now, it is provided that first cylinder bank 5 may be cut off at least partially, that is, that at least one of cylinders 11, 12, 13, 14 of first cylinder bank 5 may be cut off. This cut-off takes place, for example, by interrupting the fuel supply to the at least one cylinder of first cylinder bank 5, that is to be cut off, for the duration of the cylinder cut-off. The cut-off of the at least one cylinder of first cylinder bank 5 may also be performed in that, for the duration of the cylinder cut-off, the intake valve and/or the outlet valve of this at least one cylinder remain closed for the duration. The reactivation of the at least one cut off cylinder of first cylinder bank 5 takes place correspondingly by taking up the fuel supply again and by reopening the intake valve and/or the outlet valve of the at least one cut off cylinder.

The cylinder cut-off may additionally or alternatively be achieved also by the suspension of the ignition of at least one cylinder of first cylinder bank 5.

Now, according to the present invention, it is provided that, immediately before a cut-off or immediately after a reactivation of the at least one cylinder of first cylinder bank 5, for first cylinder bank 5 a first output variable and for second cylinder bank 10 a second output variable are set, the first output variable and the second output variable being set differently from each other in such a way that, on average, they correspond to a predefined output variable of internal combustion engine 1. In the case of the first output variable of first cylinder bank 5, in the case of the second output variable of second cylinder bank 10 and in the case of the output variable of internal combustion engine 1, for example, a torque may be involved or an output or a variable derived from a torque and/or an output. In the following, it shall be assumed, for example, that the output variable is a torque. To the extent it is physically possible, the predetermined torque of internal combustion engine 1 should not be changed by the cylinder cut-off or by cylinder reactivation, and it corresponds, for example, to a torque command mifa of the driver of the vehicle that he predefines by appropriate operation of the accelerator. In the ideal case, the driver should not notice the cylinder cut-off or the cylinder reactivation. This applies both to the stationary operation of internal combustion engine 1 during the cylinder cut-off and to the instantaneous operation of internal combustion engine 1 in a shifting phase during the activation or deactivation of the operation with a cylinder cut-off, that is, immediately before the cut-off of the at least one cylinder of first cylinder bank 5 or immediately after the reactivation of the at least one cylinder of first cylinder bank 5.

For this purpose, the second torque is increased immediately before the cut-off of the at least one cylinder of first cylinder bank 5, and this to a value that makes it possible that, even during the stationary operation of internal combustion engine 1 with at least partially cut off first cylinder bank 5, the predetermined torque of internal combustion engine 1, that is, in this example, the driver command torque mifa, is maintained unchanged. The driver of the vehicle should not notice the at least partial cut-off of first cylinder bank 5, that is, the cut-off of the at least one cylinder of the first cylinder bank. In order that the driver's command torque mifa may also be maintained unchanged in the transitional phase immediately before the cut-off of the at least one cylinder of first cylinder bank 5, so that the driver also does not sense this transitional phase, it is provided, according to the present invention, to lower the first torque of first cylinder bank 5 in this transitional phase. In this way, there comes about an asynchronous operation of internal combustion engine 1 in the transitional phase, in which the first torque and the second torque are set differently from each other, the setting taking place in such a way that they implement, on average, the predetermined torque of internal combustion engine 1. Consequently, the increase of the second torque in the transitional phase is compensated for by the lowering of the first torque. The asymmetrical setting of the first torque and of the second torque may be carried out appropriately in the transitional phase immediately after a reactivation of the at least one cylinder of first cylinder bank 5, in order to be able to set the predetermined torque of internal combustion engine 1 also in this transitional phase, unchanged, corresponding to the driver's command mifa. In this way, the second objective is also achieved, namely that the driver shall not notice the transitional phase immediately before the cut-off or immediately after the reactivation of the at least one cylinder of first cylinder bank 5. Since the increase in the second torque is compensated for in the transitional phase by a corresponding reduction of the first torque, it is not necessary to compensate for the increase of the first torque with respect to a constant second torque, for instance, by an ignition angle adjustment or by influencing the fuel supply of second cylinder bank 10, in order to hold unchanged the predetermined torque of internal combustion engine 1 to the driver's command torque mifa. Thus, one may avoid increased fuel consumption and increased exhaust gas temperatures that go along with it, caused by pulling the ignition angle to retardation. The increase of the second torque in the transitional phase may rather take place only by increasing the air supply in second air channel 40, by the appropriate setting of second throttle valve 20. The corresponding lowering of the first torque in the transitional phase may be implemented merely by influencing the air supply in first air channel 35, by the appropriate setting of first throttle valve 15. In this way, there also comes about in the respective transitional phase an asynchronous driving of the two throttle valves 15, 20, second throttle valve 20 being opened wider and first throttle valve 15 being further closed, so that the two throttle valves 15, 20 take up different settings. It is ensured thereby that, even in the respective transitional phase, the torque of internal combustion engine 1, as an average value of the first torque and the second torque, corresponds constantly and unchanged to driver's command torque mifa.

With reference to the timing diagram shown in FIG. 2, in the following, the sequence of an example method according to the present invention will be described. In the diagram shown in FIG. 2, a charge rl and a torque md are plotted against time t. Up to a first point in time $t_1$, internal combustion engine 1 is operated without cylinder cut-off.

In this context, up to first point in time $t_1$, the charge of the cylinders of both cylinder banks 5, 10 respectively takes on a value rloz, and both the first torque and the second torque take on a value mdoz which corresponds to the driver's command torque mifa. Consequently, since the first torque and the second torque are equal to mdoz which is equal to mifa, the average value of the two torques is also equal to the driver's command torque mifa. A first charge rl1 of first cylinder bank 5 may be ascertained from the engine torque and the air mass flow measured by first air mass flow meter (sensor) 55. The ascertainment of the engine torque of internal combustion engine 1 may be made using a torque sensor (not shown in FIG. 1), which measures the torque of internal combustion engine 1, and passes on the resulting measurement to engine control unit 50. First charge rl1 may be influenced by the suitable setting of first throttle valve 15. Similarly, a second charge rl2 of second cylinder bank 10 is ascertained from the air mass flow ascertained by second air mass flow sensor 60 and the engine torque, second charge rl2 being able to be influenced by changing the setting of second throttle valve 20. At first point in time $t_1$, engine control unit 50 now detects a request for the at least partial cylinder cut-off of cylinder bank 5. Consequently, at first point in time $t_1$, engine control unit 50 starts the corresponding transitional phase described. During the entire operation of internal combustion engine 1, driver's command torque mifa should, if possible, be realized only by the appropriate setting of the charge of the two cylinder banks 5, 10, that is by the appropriate setting of throttle valves 15, 20, and, if possible, not by ignition angle adjustment. That means that the ignition angle should, if possible, be held at its optimal value for all the cylinders of the two cylinder banks 5, 10, and should only be shifted to retardation for absolutely necessary torque reserves or absolutely necessary measures such as, for example, heating up a catalytic converter or increasing the exhaust gas enthalpy for a more rapid response of a possibly present exhaust gas turbocharger. Thus, at first point in time $t_1$, a first setpoint value md2soll is ascertained by engine control unit 50 for the second torque, which is required in order to be able to maintain unchanged driver's command torque mifa at a stationary operation of internal combustion engine 1 with at least partially cut off first cylinder bank 5. In the following it is assumed, for example, that when it comes to the cylinder cut-off, all cylinders 11, 12, 13, 14 of first cylinder bank 5 are to be cut off. According to that, first setpoint value md2soll for the second torque has to be selected to be twice as great as driver's command torque mifa, since, during the cylinder cut-off of first cylinder bank 5, first cylinder bank 5 no longer delivers any contribution to torque. Consequently, based on the symmetrical design of the two cylinder banks 5, 10, in the case of a second torque that is equivalent to the first setpoint value md2soll=2*mifa, on average, the driver's command torque mifa would be yielded as the torque of internal combustion engine 1. Furthermore, at first point in time $t_1$, engine control unit 50 ascertains which setpoint value rl2soll is required for the charge of second cylinder bank 10, in order to realize setpoint value md2soll for the second torque. In addition, engine control unit 50 ascertains which position second throttle valve 20 is to take up in order to set setpoint value rl2soll for the second charge. Engine control unit 50 then finally brings about the activation of second throttle valve 20 so as to realize this second setpoint value rl2soll for the second charge. In this context, the activation of second throttle valve 20 should take place as early as possible and as close as possible to first point in time $t_1$. Second charge rl2 reaches setpoint value rl2soll only at a second point in time $t_2$, that follows first point in time $t_1$, as shown in FIG. 2, and this is caused by the delay time of the intake manifold, formed by second air channel 40 and the air lines to the cylinders of second cylinder bank 10, downstream of second throttle valve 20 and the response time that comes about based on the modeling of the throttle valve angle that is to be set for second throttle valve 20, as well as the setting of the modeled position of second throttle valve 20. Similarly, the second torque of second cylinder bank 10, which is marked as md2bas in FIG. 2, also reaches first setpoint value md2soll only at second point in time $t_2$. Naturally, setpoint value rl2soll is increased compared to charge rloz that is present up to first point in time $t_1$, so that engine control unit 50 activates second throttle valve 20 to a wider opening.

At first point in time $t_1$, engine control unit 50 also ascertains a first setpoint value md1soll for the first torque, with which the increase in the second torque in the transitional phase is to be compensated for. In the present example, the case is considered in which all cylinders 11, 12, 13, 14 of first cylinder bank 5 are to be cut off. This would mean that setpoint value md1soll for the first torque would also have to be set to zero for the transitional phase between first point in time $t_1$ and second point in time $t_2$, so that, on average, between the two setpoint values md1soll and md2soll, the driver's command torque mifa could come about. However, in the transitional phase between the first point in time $t_1$ and the second point in time $t_2$, the cylinder cut-off of first cylinder bank 5 should not yet be activated. That means that the operation of cylinders 11, 12, 13, 14 of first cylinder bank 5 should be kept up in this transitional phase, that is, first cylinder bank 5 should render a contribution to torque. Consequently, setpoint value md1 should be limited downwards by the combustion limit of first cylinder bank 5, that is, first setpoint value md1soll for the first torque may not be smaller than a predetermined threshold value that is a function of the combustion limit of first cylinder bank 5. In this context, this threshold value is applied on a test stand, for example, in such a way that it is ensured that torques above this threshold value are able to be implemented without a combustion miss, but, on the other hand, this threshold value being selected to be as small as possible. In the present example as shown in FIG. 2, then, engine control unit 50 selects setpoint value md1soll for the first torque, for instance, equal to the threshold value predetermined for the guarantee of the combustibility. Engine control unit 50 further ascertains a setpoint value rl1soll for the first charge which is required for realizing first setpoint value md1soll for the first torque. First setpoint value md1soll for the first torque is less than torque mdoz and setpoint value rl1soll for the first charge is smaller than charge rloz. Engine control unit 50 then ascertains the position of first throttle valve 15, which is required for realizing first setpoint value rl1soll at the current engine rotary speed, and activates throttle valve 15 to set this position. In this context, this position of first throttle valve 15 is more closed compared to the position present up to the first point in time $t_1$ of first throttle valve 15. Based on the intake manifold delay time that was described, and that also applies to first cylinder bank 5, and the response time conditioned upon the modeling and setting of the position of first throttle valve 15, first setpoint value rl1soll for the first charge and first setpoint value md1soll for the first torque are reached only at second point in time $t_2$.

First charge rl1 then reaches, at second point in time $t_2$, setpoint value rl1soll for the first charge and first torque md1 reaches, at second point in time $t_2$, first setpoint value md1soll of the first torque. Since first setpoint value md1soll for the first torque in the transitional period between first point in time $t_1$ and second point in time $t_2$ is greater than zero, a torque comes about by averaging first setpoint value md1soll for the first torque and first setpoint value md2soll for the second torque, which is greater than driver's command torque mifa. Therefore, for the transitional period between first point in time $t_1$ and second point in time $t_2$, a second setpoint value md2soll' has to be set for the second torque that is supposed to be reached, at constant setpoint value rl2soll for the second charge, by pulling the ignition angle to retardation for cylinders 21, 22, 23, 24 of second cylinder bank 10 at second point in time $t_2$. Consequently, second torque md2bas, brought about only by the charge intervention by the appropriate setting of second throttle valve 20, based on the ignition angle intervention, is reduced to second torque md2 that finally actually arises, which, at second point in time $t_2$, reaches second setpoint value md2soll' of the second torque. In this context, second setpoint value md2soll' of the second torque, in the present example, is to be selected to be less than first setpoint value md2soll for the second torque, and is to be selected so that md2soll'+md1soll=2*mifa. Thereby it may also be achieved that the average value of actually arising second torque md2 and actually arising first torque md1, in the transitional phase between first point in time $t_1$ and second point in time $t_2$, is always equal to driver's command torque mifa. This is clarified in FIG. 2 in that, at different times in the transitional phase between point in time $t_1$ and second point in time $t_2$, the distance of the actually arising second torque md2 from the driver's command torque mifa is in each case equivalent in absolute value to the distance of the actually arising first torque md1 from driver's command torque mifa. Thus, in FIG. 2, $\Delta 2 = \Delta 3$, $\Delta 2' = \Delta 3'$ and $\Delta 2'' = \Delta 3''$. Consequently, the curve of first torque md1 and the curve of second torque md2 are symmetrical with respect to driver's command torque mifa, so that at any time between first point in time $t_1$ and second point in time $t_2$ the average of first torque md1 and second torque md2 is equal to driver's command torque mifa.

In the case in which not all cylinders of first cylinder bank 5 are to be cut off, setpoint value md2soll for the second torque may be selected to be smaller. What this can lead to is that second setpoint value md2soll of the second torque may be fully compensated for by setpoint value md1soll of the first torque, with regard to the unchanged setting of driver's command torque mifa, so that a shift to retardation in the ignition angle of the cylinders of second cylinder bank 10 is not required. Depending on the number of cylinders of cylinder bank 5 that are to be cut off, it may even be provided that first setpoint value md1soll of the first torque may be selected to be greater than the threshold value predetermined as a function of combustibility, in order to compensate first setpoint value md2soll of the second torque completely, with respect to an unchanged maintaining of driver's command torque mifa as the output torque of internal combustion engine.

Figure 2:
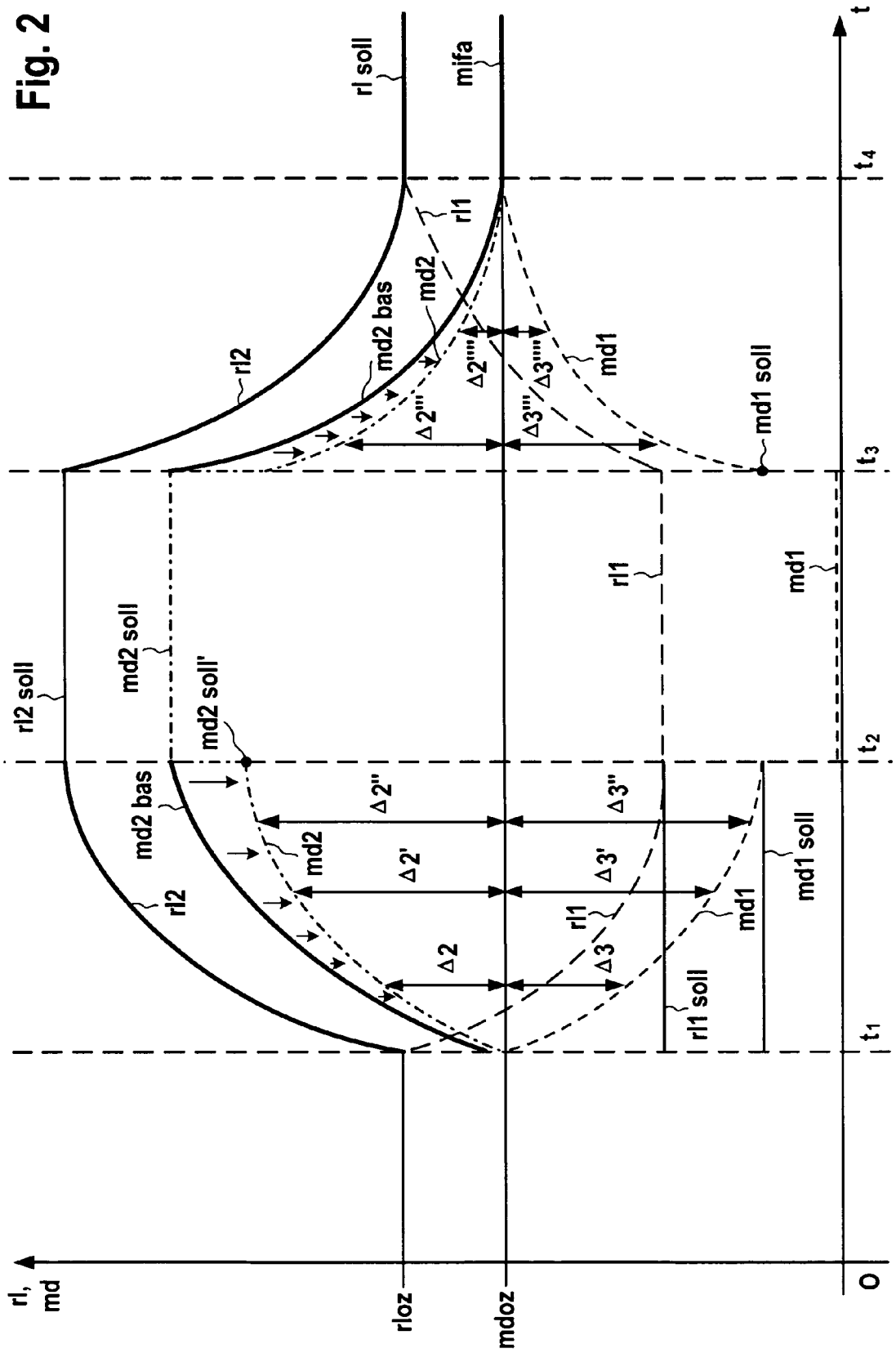
FIG. 2 is a diagram illustrating the time curves of a charge and a torque according to the present invention.

In the following, we shall look again at the case on which FIG. 2 is based, namely that all the cylinders of first cylinder bank 5 are to be cut off. At second point in time $t_2$, second torque md2 has reached second setpoint value md2soll' for the second torque. Similarly, second charge rl2 has reached setpoint value rl2soll for the second charge at second point in time $t_2$. In addition, at second point in time $t_2$, first charge rl1 has reached setpoint value rl1soll for the first charge. Also at second point in time $t_2$, first torque md1 has reached first setpoint value md1soll for the first torque. In this context, what is decisive is that at second point in time $t_2$ second charge rl2 has reached setpoint value rl2soll for the second charge, so that, beginning at second point in time $t_2$, second cylinder bank 10 may make a contribution to torque at first setpoint value md2soll of the second torque, which, taken by itself, is sufficient to implement predetermined driver's command torque mifa. Thus, at second point in time $t_2$, the cylinder cut-off may be activated. According to FIG. 2, this does in fact take place at point in time $t_2$. Therefore, at second point in time $t_2$, first torque md1 jumps to the value zero and stays there for the duration of the cut-off of all cylinders of first cylinder bank 5, until a subsequent third point in time $t_3$. In this context, the position of first throttle valve 15 remains unchanged, so that, in the time span of the cylinder cut-off from second point in time $t_2$ to third point in time $t_3$, first charge rl1 remains at setpoint value rl1soll for the first charge. At second point in time $t_2$, in order to bring second torque md2 to first setpoint value md2soll of the second torque, an abrupt reversal of the retardation shift of the ignition angle for the cylinders of second cylinder bank 10 is required at second point in time $t_2$. Consequently, in an ideal way, at second point in time $t_2$, second torque md2 jumps from second setpoint value md2soll' to first setpoint value md2soll of the second torque, so that driver's command torque mifa may be maintained unchanged as the output torque of the internal combustion engine. The setting of second throttle valve 20 is also not changed for the duration of the cylinder cut-off between second point in time $t_2$ and third point in time $t_3$, in the stationary case, so that second charge rl2 remains at setpoint value rl2soll of the second charge, for this period. Between the second point in time $t_2$ and the third point in time $t_3$, second torque md2 remains at first setpoint value md2soll for the second torque.

At third point in time $t_3$, engine control unit 50 detects a request for deactivating the cylinder cut-off. Then, at third point in time $t_3$, engine control unit 50 checks in which position first throttle valve 15 is currently located, and the control unit 50 calculates from that position the allocated first charge rl1 and the allocated first torque md1 of first cylinder bank 5. In this context, as shown in the example in FIG. 2, at third point in time $t_3$ the setting of first throttle valve 15 should still be unchanged, when compared to second point in time $t_2$. That means that the engine control unit, at third point in time $t_3$, ascertains setpoint value rl1soll for first charge rl1, and setpoint value md1soll for first torque md1. Furthermore, it is known in engine control unit 50 that the position of second throttle valve 20 has also not changed, so that second charge rl2 is still equivalent to setpoint value rl2soll and second torque md2 is still equivalent to first setpoint value md2soll for the second torque, at third point in time $t_3$. For all these considerations it was assumed, for example, that the engine's rotary speed has not changed from second point in time $t_2$ to third point in time $t_3$, but rather, for the overall consideration according to FIG. 2, that is, from point in time t=0, it is assumed that the engine's rotary speed of internal combustion engine 1 remains constant, at least to a fourth point in time $t_4$ that follows the third point in time $t_3$, or beyond that. When there are changing operating conditions of the internal combustion engine in the time between $t_2$ and $t_3$, such as in the rotary speed or the combustion limit, one would first have to ascertain second torque md2bas that actually sets in at third point in time $t_3$ without an ignition angle intervention. This is equivalent to double the driver's command torque that is present at point in time $t_3$. Setpoint value md1soll for the first torque, which is to be set at third point in time $t_3$, then is yielded by subtracting the difference (md2bas−mifa) from driver's command torque mifa. If md1soll, thus ascertained, lies below the combustion limit, md1soll is then selected at third point in time $t_3$ corresponding to the threshold value predetermined as a function of the combustion limit of first cylinder bank 5. Accordingly, second torque md2 at third point in time $t_3$ is ascertained, starting from md2bas by ignition angle timing retardation, in such a way that the equation (md2−mifa)=(mifa−md1soll) is satisfied. Engine control unit 50 also ascertains whether, for the reactivation of all the cylinders of first cylinder bank 5 at third point in time $t_3$, the ignition angle for the cylinders of second cylinder bank 10 still has be shifted to retardation, so that first torque md1 and second torque md2, on average, realize the predetermined driver's command torque mifa. This is the case in the present example, because all the cylinders of first cylinder bank 5 had been cut off. Therefore, at third point in time $t_3$, along with the reactivation of all cylinders of first cylinder bank 5, first torque md1 jumps to first setpoint value md1soll for the first torque, and in the ideal case, at the same time, by the appropriate timing retardation of the ignition angle of the cylinders of second cylinder bank 10, second torque md2 is abruptly lowered from first setpoint value md2soll to second setpoint value md2soll' for the second torque, so that, on average, at the output of internal combustion engine, driver's command torque mifa comes about again. Engine control unit 50 also now specifies this driver's command torque mifa as setpoint value both for the first torque and for the second torque. Accordingly, engine control unit 50, also at third point in time $t_3$, ascertains as a new setpoint value rl2soll for the second charge and as a new setpoint value rl1soll for the first charge, a common setpoint value rlsoll=rloz, and thus the same throttle valve position to be set for both throttle valves 15, 20. Based on the intake manifold delay described, and the response time to be taken into consideration in the modeling and setting of the positions of throttle valves 15, 20, driver's command torque mifa is reached as the torque of the two cylinder banks 5, 10, and charge rlsoll is reached as the charge of the two cylinder banks 5, 10 only at fourth point in time $t_4$, and is subsequently held stationary. Thus, at fourth point in time $t_4$, first charge rl1 and second charge rl2 in this example achieve the common setpoint value rlsoll, and first torque md1 and second torque md2 at fourth point in time $t_4$ attain predetermined driver's command torque mifa.

The described ignition angle retardation shift would, in turn, not be required if the cylinder reactivation would not take place starting from the cut-off of all cylinders of first cylinder bank 5, i.e. if first setpoint value md2soll for the second torque is able to be completely compensated for by a setpoint value md1soll for the first torque within the combustibility range of first cylinder bank 5 for the formation of driver's command torque mifa as output torque of internal combustion engine 1. The ignition angle retardation shift is, in turn, shown in FIG. 2 starting from second base torque md2bas, which would come about at an optimal ignition angle without ignition angle timing retardation. Because of the ignition angle timing retardation of the cylinders of second cylinder bank 10 beginning at third point in time $t_3$, it is made certain that at any desired point in time between third point in time $t_3$ and fourth point in time $t_4$, first torque md1 and second torque md2, on average, yield the driver's command torque mifa as output torque of internal combustion engine 1. This means that at each point in time between third point in time $t_3$ and fourth point in time $t_4$ the distance between second torque md2 and driver's command torque mifa is equivalent in absolute value to the distance between first torque md1and driver's command torque mifa. In FIG. 2 this is indicated by the distances $\Delta 2'''=\Delta 3'''$ and $\Delta 2''''=\Delta 3''''$.

As may be seen in FIG. 2, the contribution to torque of the cylinders of second cylinder bank 10, which comes about by the ignition angle timing retardation immediately before the cut-off of the cylinders of first cylinder bank 5, increases in absolute value continuously from first point in time $t_1$ to second point in time $t_2$, so as to achieve the required torque compensation. Similarly, the ignition angle retardation shift from third point in time $t_3$ to fourth point in time $t_4$, and the torque contribution connected therewith of second cylinder bank 10, continuously decreases in absolute value. The ignition angle timing retardation increases from first point in time $t_1$ to second point in time $t_2$, and decreases again from third point in time $t_3$ to fourth point in time $t_4$. Consequently, engine control unit 50 has to continuously adjust the ignition angle setting, starting from the optimal ignition time, in order to guarantee the compensation of first torque md1and second torque md2 for consistent maintaining of driver's command torque mifa as output torque of internal combustion engine 1. Since second setpoint value md2soll' of the second torque is ascertained by engine control unit 50 already at first point in time $t_1$ or immediately thereafter, the curve that comes about for second torque md2 is known to engine control unit 50 in the same way as the curve coming about of second torque md2bas at the optimal ignition angle, which at second point in time $t_2$ attains the calculated first setpoint value md2soll of the second torque. Thus, already at first point in time $t_1$, for the transitional phase between first point in time $t_1$ and second point in time $t_2$, engine control unit 50 may calculate in advance the ignition angle retardation shift required for each point in time of this transitional phase, and then set it at the appropriate time. The corresponding applies to the reactivation of the cylinders of first cylinder bank 5 in the second transitional phase from third point in time $t_3$ to fourth point in time $t_4$, where the engine control unit, at third point in time $t_3$, is able to correspondingly precalculate the curve of second torque md2 and second torque md2bas at the optimal ignition angle, and consequently is also able to precalculate the ignition angle retardation shifts for each point in time of this second transitional phase, and then also to set it at the appropriate time.

The curve of second torque md2 at an ignition angle set to timing retardation, and the curve of second torque md2bas at an optimal ignition angle, can then be precalculated in engine control unit 50 if the intake manifold delay and the response time are known in the modeling and setting of the position of second throttle valve 20. Correspondingly, the curve of first torque md1 may be precalculated if the intake manifold delay and the response time are known during the modeling and setting of the position of first throttle valve 15.

In this context, it is assumed in this example that the intake manifold delay described and the response time are approximately identical for the two cylinder banks 5, 10 and the two throttle valves 15, 20. The operating points of the two cylinder banks 5, 10 may also be different. Consequently, in the example examined here, the time constants for the curve of first torque md1, second torque md2 at time retardation of the angle of ignition and of second torque md1bas at optimal angle of ignition are approximately equal, and may, for instance, be applied on a test stand depending on the operating point, and stored in a memory assigned to engine control unit 50, in order to be able to precalculate the respective curve of first torque md1 and second torque md2 having timing retardation of the ignition angle, and of second torque md2bas at optimal ignition angle, in the manner described, for the two transitional phases immediately before the cut-off of the cylinders of first cylinder bank 5 and immediately after the reactivation of the cylinders of first cylinder bank 5.

Another possibility for setting and adjusting the ignition angle retardation shift may take place by a regulation in such a way that engine control unit 50 at any point in time in the first transitional phase $t_1 \leq t \leq t_2$ and in the second transitional phase $t_3 \leq t \leq t_4$ determines the distance between first torque md1 and driver's command torque mifa and the distance between second torque md2 and driver's command torque mifa, and performs a timing retardation on the ignition angle of the cylinders of second cylinder bank 10 in such a way that, for the same points in time, approximately equal distances come about between first torque md1 and driver's command torque mifa, on the one hand, and second torque md2 having a timing-retarded ignition angle and driver's command torque mifa, on the other hand. Since, in this case, the calculation of the ignition angle timing retardation always takes place only at the respective point in time in the appropriate transitional phase, in the real case a 100% compensation of first torque md1 and second torque md2, having timing retarded ignition angle, is only approximately possible with respect to an unchanged maintaining of driver's command torque mifa. In this context, the regulation may take place in such a way that first torque md1 and second torque md2 are ascertained regularly within the two transitional phases, for example, modeled from other operating variables of internal combustion engine 1, and the sum of the two torques md1, md2 is supplied to a controller at each scanning point, whose output variable is a timing retardation angle for the ignition angle of the cylinders of second cylinder bank 10, which is selected in such a way that it matches the sum of the two torques md1, md2 as closely as possible to the value 2*mifa.

Figure 3:
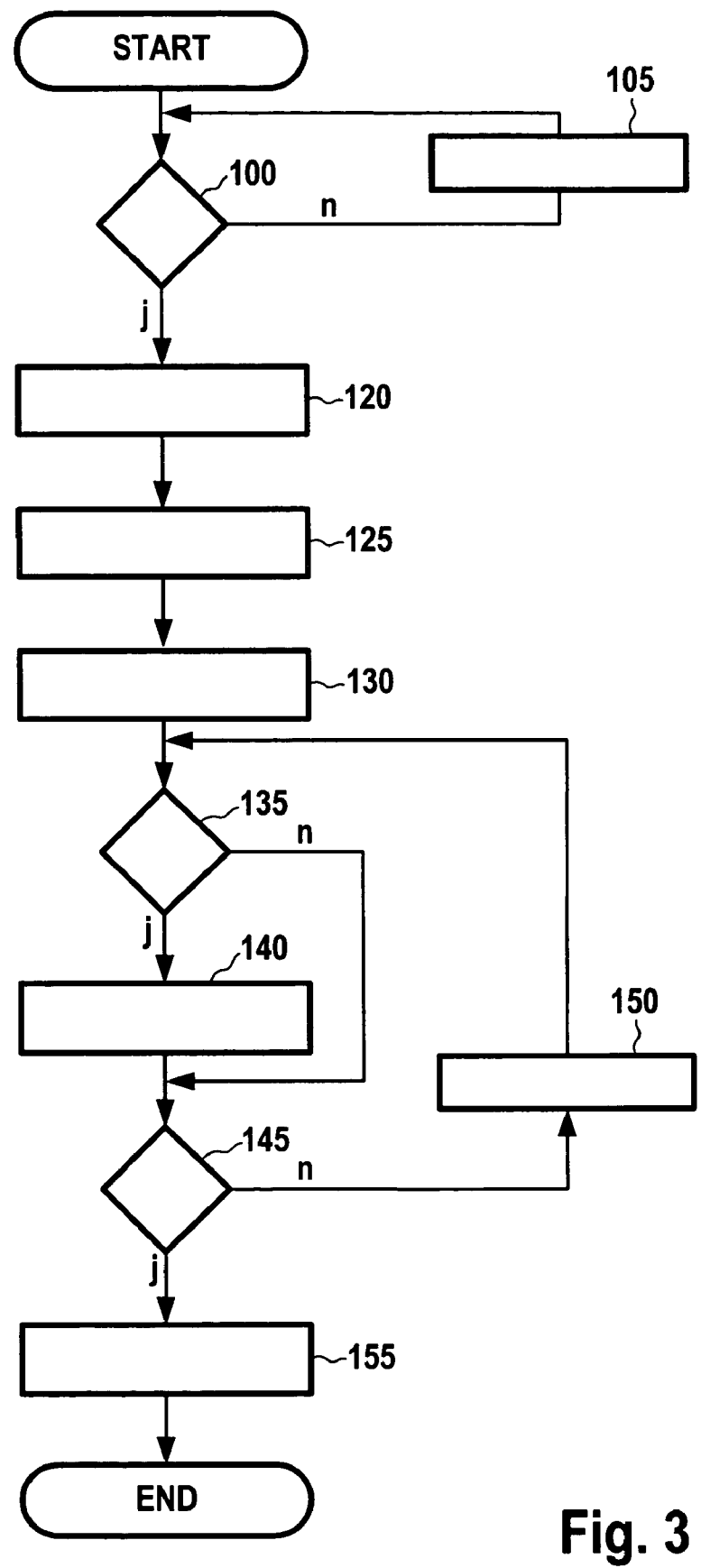
FIG. 3 is a flowchart illustrating the preparation of an activation of a cylinder cut-off.

FIG. 3 shows a flow chart for an exemplary sequence of the method according to the present invention for the first transitional phase immediately before the at least partial cut-off of first cylinder bank 5.

After the start of the program, the engine control unit checks, at a program point 100, whether a command to activate a cylinder cut-off is present, according to which a predefined number of cylinders of first cylinder bank 5 is to be cut off. If this is the case, the program branches to a program point 120, otherwise the program branches to a program point 105.

At program point 105, engine control unit 50 runs through a waiting loop and subsequently branches back to program point 100.

At program point 120, engine control unit 50 ascertains first setpoint value md1soll for the second torque and setpoint value rl2soll for the second charge. Subsequently, the program branches to a program point 125.

At program point 125, engine control unit 50 ascertains first setpoint value md1soll for the first torque and setpoint value rl1soll for the first charge, possibly, as described before, limited downwards by the predetermined threshold value for first setpoint value md1soll of the first torque, whereby, then, setpoint value rl1 for the first charge is also correspondingly limited. In this context, first setpoint value md1soll of the first torque and setpoint value rl1soll for the first charge may also be limited in that respectively they are not more distant in absolute value from the driver's command torque that is to be realized and from charge value rlsoll that is to be realized, than first setpoint value md1soll for the second torque is from driver's command torque mifa and setpoint value rl2soll of the second charge is from setpoint value rl soll. Subsequently, the program branches to a program point 130.

At program point 130, engine control unit 50 sets first throttle valve 15 and second throttle valve 20 for the realization of setpoint value rl1soll for the first charge and rl2soll for the second charge. Subsequently, the program branches to a program point 135.

At program point 135, engine control unit 50 checks whether the distance between the actually occurring second torque md2 and the driver's command torque mifa that is to be set for internal combustion engine 1, differs in absolute value from the distance between first torque md1, that is setting in, and driver's command torque mifa in a first scanning point in time of the first transitional phase between first point in time $t_1$ and second point in time $t_2$. If this is the case, the program branches to a program point 140, otherwise the program branches to a program point 145.

At program point 140, engine control unit 50 shifts the angle of ignition of the cylinders of second cylinder bank 10 by a predetermined incremental value towards retardation, if the distance between second torque md2 that is actually coming about and driver's command torque mifa is greater in absolute value than the distance between first torque md1 that is actually coming about and driver's command torque mifa. Otherwise, engine control unit 50 shifts this ignition angle by an increment towards advance. The program subsequently branches to program point 145.

At program point 145, engine control unit 50 checks whether second torque md2 that is actually coming about has reached second setpoint value md2soll for the second torque, or whether second charge rl2 has reached setpoint value rl2soll for the second charge. If this is the case, the program branches to a program point 155, otherwise the program branches to a program point 150.

At program point 150, engine control unit 50 scans first torque md1 that is actually coming about and second torque md2 that is actually coming about, at the subsequent scanning point in time. Thereafter, the program branches back to program point 135, and the scanning is carried out there for the scanning point seen at program point 150.

At program point 155 second point in time $t_2$ has been reached, and engine control unit 50 revokes an existing ignition angle retardation and sets the optimal ignition angle and simultaneously cuts off the cylinders of first cylinder bank 5 that are to be cut off. The program is subsequently exited.

Figure 4:
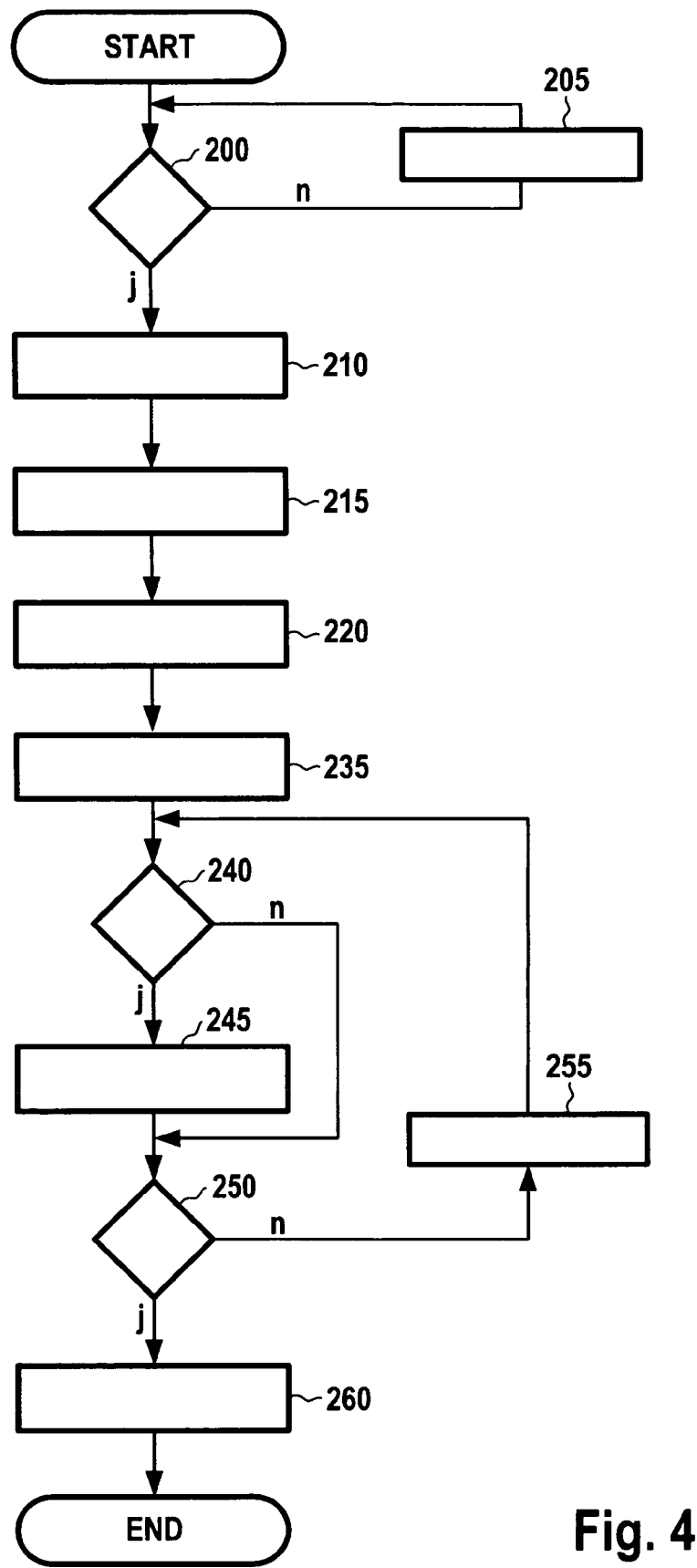
FIG. 4 is a flowchart illustrating the preparation of a deactivation of a cylinder cut-off.

FIG. 4 shows a flow diagram for an exemplary sequence of the method according to the present invention, in response to the reactivation of at least one cylinder of first cylinder bank 5.

After the start of the program, engine control unit 50 checks, at a program point 200, whether a command is being received in which it is stated that a certain number of cut off cylinders of first cylinder bank 5 is to be reactivated again. If this is the case, the program branches to a program point 210, otherwise the program branches to a program point 205.

At program point 205, engine control unit 50 executes a wait loop. The method subsequently branches back to program point 200 again.

At program point 210, engine control unit 50 ascertains, from the setting of first throttle valve 15, first charge rl1 that would come about if the reactivated cylinders, and the cylinders yet to be reactivated of first cylinder bank 5, were all reactivated. Furthermore, engine control unit 50 derives allocated torque md1 from this first charge rl1. Similarly, engine control unit 50, at program point 210, derives, from the setting of second throttle valve 20, actually present second charge rl2 and allocated second torque md2. In addition, at program point 210 engine control unit 50 ascertains a possibly required ignition angle retardation shift of the cylinders of second cylinder bank 10, in order to compensate for the expected jump, in response to the reactivation of the cylinders of first cylinder bank 5, of the actually present first torque to the first torque that is to be expected as a function of the throttle valve setting of first throttle valve 15 for all the reactivated, and soon to be reactivated, cylinders of first cylinder bank 5. In the case in which all cylinders of first cylinder bank 5 are to be reactivated, one may alternatively prespecify the ignition angle timing retardation for the cylinders of second cylinder bank 10 in such a way that the distance of second torque md2 from driver's command torque mifa is, in absolute value, equivalent to the distance of first torque md1 from driver's command torque mifa, that is to be expected for the cylinder reactivation of first cylinder bank 5. If the two distances ascertained are already equal, an ignition angle retardation shift is not necessary. At program point 210, in addition, a third setpoint value md2soll" is ascertained for the second torque and a corresponding second setpoint value rl2soll for the second charge, which are to come about after the reactivation of the cylinders of cylinder bank 5 that are to be reactivated. Correspondingly, a second setpoint value md1soll' for the first torque and an allocated second setpoint value rl1soll' for the first charge are ascertained, which setpoint values are to come about after the reactivation of the cylinders of first cylinder bank 5 that are to be reactivated. In this context, third setpoint value md2soll" for the second torque and second setpoint value md1soll' for the first torque should be selected so that, on average, they form driver's command torque mifa of internal combustion engine 1 that is to be set. In the case where all the cylinders of first cylinder bank 5 are to be reactivated, third setpoint value md2soll" for the second torque and second setpoint value md1soll' for the first torque may in each case be selected to be equal to driver's command torque mifa. This is also reflected in the exemplary embodiment shown in FIG. 2. If, however, not all cylinders of first cylinder bank 5 are reactivated, as a rule, third setpoint value md2soll" for the second torque differs from second setpoint value md1soll' for the first torque. Correspondingly, up to first point in time $t_1$, various values for first torque md1 and second torque md2 or for first charge rel and second charge rl2 may also be present if, up to first point in time $t_1$, some of the cylinders of first cylinder bank 5 are already cut off. However, in this context, up to first point in time $t_1$, the two torques of the two cylinder banks 5, 10, on average, also yield driver's command torque mifa. Subsequently, the program branches to a program point 215.

At program point 215, engine control unit 50, at third point in time $t_3$, induces the reactivation of the cylinders of first cylinder bank 5 that are to be reactivated, as well as the possibly required timing retardation of the ignition angle of the cylinders of second cylinder bank 10, at the same point in time $t_3$. Subsequently, the program branches to a program point 235.

At program point 235, engine control unit 50 induces the setting of first throttle valve 15 to a setting used for achieving second setpoint value rl1soll" for the first charge. Furthermore, at program point 235, engine control unit 50 induces the setting of second throttle valve 20 so as to set second setpoint value rl2soll' for the second charge. The setting of first charge rl1 and second charge rl2, in this context, are subject to the time constants described, as a function of the respective intake manifold delay and the named respective response time. Subsequently, the program branches to a program point 240.

At program point 240, engine control unit 50 checks whether the distance between second torque md2 that is actually coming about and driver's command torque mifa differs in absolute value, at a first scanning point in time after third point in time $t_3$, from the distance of first torque md1 that is actually coming about from driver's command torque mifa. If this is the case, the program branches to a program point 245, otherwise the program branches to a program point 250.

At program point 245, engine control unit 50 shifts the angle of ignition of the cylinders of second cylinder bank 10 by a predetermined incremental value towards retardation, if the distance between second torque md2 that is actually coming about and driver's command torque mifa is greater in absolute value than the distance between first torque md1 that is actually coming about and driver's command torque mifa. If, on the other hand, the distance between torque md2 that is actually coming about and driver's command torque mifa is, in absolute value, less than the distance between first torque md1 that is actually coming about and driver's command torque mifa, then engine control unit 50 induces a shifting of the ignition angle of the cylinders of second cylinder bank 10 by a predetermined increment towards advance, to the extent this is possible. The program subsequently branches to program point 250.

At program point 250, engine control unit 50 checks whether second torque md2 that is actually setting in has reached third predetermined setpoint value md2soll" of the second torque or it checks whether first torque md1 that is actually setting in has reached second setpoint value md1soll' of the first torque, that is, that the fourth point in time $t_4$ has been reached. If this is the case, the program branches to a program point 260, otherwise the program branches to a program point 255.

At program point 255, engine control unit 50 induces a scanning of second torque md2 that is actually setting in and of first torque md1 that is actually setting in, at the subsequent scanning point in time. Thereafter, the program branches back to program point 240, and the checking described there for this scanning point seen at program point 255 is carried out.

At program point 260, a possibly still present ignition angle retardation shift of the cylinders of second cylinder bank 10 is revoked. The program is subsequently exited.

It may further be provided that the change of first torque md1 immediately before the cut-off or immediately after the reactivation of the at least one cylinder of first cylinder bank 5, that is, in the first or second transitional phase, is limited in absolute value by a change in the second torque, in addition to the downwards limitation by the predetermined threshold value.

Correspondingly, the change in first charge rl1 in the first transitional phase or in the second transitional phase may be limited in absolute value to the change in second charge rl2.

After the cut-off or before the reactivation of the at least one cylinder of first cylinder bank 5, that is, between second point in time $t_2$ and third point in time $t_3$, first setpoint value md2soll for the second torque is realized only by the influencing of the air supply, using second throttle valve 20.

In the first transitional phase between first point in time $t_1$ and second point in time $t_2$, as well as in the second transitional phase between third point in time $t_3$ and fourth point in time $t_4$, first throttle valve 15 and second throttle valve 20 are set to take up positions that are different from each other by engine control unit 50. The corresponding applies to the example shown in FIG. 2 also for the state of cut-off of the at least one cylinder of first cylinder bank 5 between second point in time $t_2$ and third point in time $t_3$.

The present exemplary embodiment was described for two cylinder banks 5, 10, in which the cylinders that are able to be cut off being situated only in first cylinder bank 5. Additional cylinder banks may be provided that have cylinders able to be cut off, and additional cylinder banks may be provided that do not have cylinders able to be cut off, like cylinder bank 10. In any case, what is important for the implementation of the present invention is that a resulting output variable of the cylinder bank or the cylinder banks not having cylinders that are able to be cut off is set differently from the resulting output variable of the cylinder bank or cylinder banks having cylinders that are able to be cut off immediately before the cut-off or immediately after a reactivation of at least one cylinder of the at least one cylinder bank having cylinders that are able to be cut off, the two resulting output variables being set in such a way that, on average, they are equivalent to the predetermined output variable of the internal combustion engine. In this context, to each of the cylinder banks may also be assigned an actuator for influencing the air supply, especially a throttle valve, as was described in FIG. 1 for the two cylinder banks shown there. Also in this context, each of the throttle valves may be activated separately from engine control unit 50. Alternatively, the throttle valves of the cylinder banks having cylinders that are able to be cut off may each be activated for setting an equal first position, and the throttle valves of the cylinder banks having cylinders that are not able to be cut off may be activated for setting a respectively equal second position, by engine control unit 50, the first position and the second position differing from each other. In this context it is provided in general that, in the implementation of the method according to the present invention using actuators for influencing the air supply to the individual cylinder banks, the positions of at least two of the throttle valves differ from one another, one of the two throttle valves influencing the air supply to a cylinder bank having cylinders that are able to be cut off, and the other of the two throttle valves influencing the air supply to a cylinder bank not having cylinders that are able to be cut off.

The resulting output variable of internal combustion engine 1 comes about in each case at all times from the average of the output variables of all the cylinder banks used. Alternatively, the resulting output variable of internal combustion engine 1 comes about from the average of a) the average of the output variables of the cylinder banks having cylinders that are not able to be cut off, and b) the average of the output variables of the cylinder banks having cylinders that are able to be cut off.

If, as shown in FIG. 2, an ignition angle retardation shift of the cylinders of second cylinder bank 10 in the first transitional phase and/or in the second transitional phase were to be provided, then this ignition angle retardation shift is still smaller than as for the case according to the conventional approach, in which the increase in the second torque is compensated for by additional opening of second throttle valve 20, and not by corresponding closing of first throttle valve 15, and thereby lowering the first torque.

An ignition angle intervention during the phase in which at least one cylinder of first cylinder bank 5 is cut off comes into consideration only when it is required for other reasons, such as to build up a torque reserve or, for instance, by a timing retardation of the ignition angle to heat up a catalytic converter in common exhaust branch 45, or for example, to speed up the response behavior of an exhaust gas turbocharger of the internal combustion engine. An additional ignition angle intervention between second point in time $t_2$ and third point in time $t_3$ during the cut-off of at least one cylinder of first cylinder bank 5 may also come into consideration if overshooting values should occur of the second torque of second cylinder bank 10 that is actually setting in, above first setpoint value md2soll for the second torque. In this case, the overshooting values could be reduced by appropriate temporary retarding of the ignition angle.

In FIG. 2 it was illustrated, for the possibly required torque compensation using ignition angle adjustment in the first and second transitional phase, retarding the ignition angle of the cylinders of second cylinder bank 10 as a measure. In addition or alternatively, as far as possible, the ignition angle of the cylinders of first cylinder bank 5 may in these phases be adjusted to advance, so as to achieve the desired compensation effect. However, since, as a rule, first cylinder bank 5 is operated with optimal, that is, most advanced possible ignition angle, in this case a further timing advancement of the ignition angle is not absolutely advisable.

In the present exemplary embodiment it was assumed that, per cylinder bank, four cylinders were provided. However, more or fewer cylinders could also be provided, but, at least one cylinder per cylinder bank, different cylinder banks also being able to differ in the number of their cylinders. In the case in which the cylinder banks used, as in the exemplary embodiment shown in FIGS. 1 and 2, in each case have the same number of cylinders, it follows that both cylinder banks supply the same torque contribution, provided all cylinders or, in each case, equal number of cylinders have been reactivated. As long as the number of cylinders from one cylinder bank to another is different, their maximum possible torque contribution differs also, so that in this case, in turn, one generally has to assume that, also up to first point in time $t_1$ and beginning from fourth point in time $t_4$, different values are present for the torques of the respective cylinder banks. However, for the different development of the torque contributions of the individual cylinder banks in the two transitional phases, this changes nothing in principle, as compared to the exemplary embodiment described, as in FIG. 2; only the initial point, to first point in time $t_1$, and the end point, to fourth point in time $t_4$, for the torques of the respective cylinder banks are then different from one another.

Furthermore, it may also be provided that, in the exemplary embodiment described, second cylinder bank 10 also has cylinders that are able to be cut off, whereupon, then, that cylinder bank having the smaller number of cylinders to be blanked out increasing its torque according to the exemplary embodiment according to FIG. 2, and the other cylinder bank reducing its torque correspondingly, in order to maintain the resulting driver's command torque mifa. In the case in which both cylinder banks 5, 10 have the same number of cylinders to be blanked out, optionally, for one of the two cylinder banks, the torque in the transitional phases could be increased compared to driver's command torque mifa, and the torque of the other cylinder bank could be lowered correspondingly below driver's command torque mifa. In this context, it makes no difference for which of the two cylinder banks the torque is raised and for which of the two cylinder banks the torque is lowered.

In the case of a Diesel engine, the method according to the present invention may be applied analogously, the function of the throttle valve being able to be assumed by the setting of the fuel quantity supplied to the respective cylinder bank, and the function of the ignition angle shift being able to be assumed by the shift in the point of injection.

What is claimed is:

1. A method for operating an internal combustion engine having at least a first cylinder bank and a second cylinder bank, wherein at least one cylinder of the first cylinder bank is configured to be at least one of selectively cut off and subsequently reactivated, the method comprising:
   setting, one of immediately before a cut off and immediately after a reactivation of the at least one cylinder of the first cylinder bank, a first output variable for the first cylinder bank and a second output variable for the second cylinder bank;
   wherein the first output variable and the second output variable are set to be different from each other such that an average of the first output variable and the second output variable is equivalent to a predetermined output variable of the internal combustion engine.

2. The method as recited in claim 1, further comprising:
   influencing an air supply to the first cylinder bank by at least one first actuator; and
   influencing an air supply to the second cylinder bank by at least one second actuator.

3. The method as recited in claim 2, wherein the at least one cylinder of the first cylinder bank is cut off only when a predetermined value of the second output variable has been reached because of the influencing of the air supply to the second cylinder bank using the at least one second actuator.

4. The method as recited in claim 3, wherein the setting of the second output variable includes influencing of an ignition angle.

5. The method as recited in claim 4, wherein the influencing of the ignition angle is revoked during the cut off of the at least one cylinder of the first cylinder bank.

6. The method as recited in claim 4, wherein the influencing of the ignition angle is initiated during the reactivation of the at least one cylinder of the first cylinder bank.

7. The method as recited in claim 3, wherein an absolute value of the first output variable is limited to a predetermined threshold value floor.

8. The method as recited in claim 7, wherein the predetermined threshold value is selected as a function of a combustion limit of the first cylinder bank.

9. The method as recited in claim 3, wherein one of immediately before the cut off and immediately after the reactivation of the at least one cylinder of the first cylinder bank, an absolute value of a change in the first output variable is limited by a change in the second output variable.

10. The method as recited in claim 3, further comprising:
    predetermining a third output variable for the second cylinder bank, wherein the third output variable is predetermined in such a way that the predetermined output variable of the internal combustion engine is achieved one of after the cut off and before the reactivation of the at least one cylinder of the first cylinder bank.

11. The method as recited in claim 10, wherein the third output variable is realized, one of after the cut off and before the reactivation of the at least one cylinder of the first cylinder bank, only by the influencing of the air supply using the at least one second actuator.

12. The method as recited in one of claim 2, wherein the first output variable is set by the influencing of the air supply using the at least one first actuator in such a way that an increase in the second output variable is compensated for with respect to the predetermined output variable of the internal combustion engine.

13. The method as recited in one of claim 3, wherein the first output variable is set by the influencing of the air supply using the at least one first actuator in such a way that an increase in the second output variable is compensated for with respect to the predetermined output variable of the internal combustion engine.

14. The method as recited in claim 3, wherein the at least one first actuator and the at least one second actuator are set so as to take up positions that are different from each other.

* * * * *